United States Patent
Upfill-Brown et al.

(10) Patent No.: US 12,095,410 B2
(45) Date of Patent: Sep. 17, 2024

(54) STAGED STOWAGE OF SOLAR TRACKERS AND METHOD THEREOF

(71) Applicant: NEXTracker LLC, Fremont, CA (US)

(72) Inventors: Stuart Upfill-Brown, San Francisco, CA (US); Tushar Guha, Milpitas, CA (US); Jacob Mark Morin, Phoenix, AZ (US)

(73) Assignee: NEXTRACKER LLC, Fremont, CA (US)

( * ) Notice: Subject to any disclaimer, the term of this patent is extended or adjusted under 35 U.S.C. 154(b) by 248 days.

(21) Appl. No.: 17/584,035

(22) Filed: Jan. 25, 2022

(65) Prior Publication Data

US 2022/0224283 A1    Jul. 14, 2022

Related U.S. Application Data

(62) Division of application No. 16/196,817, filed on Nov. 20, 2018, now Pat. No. 11,251,746.

(51) Int. Cl.
*H02S 20/32* (2014.01)
*H02J 3/38* (2006.01)

(52) U.S. Cl.
CPC .............. *H02S 20/32* (2014.12); *H02J 3/388* (2020.01)

(58) Field of Classification Search
CPC ........... H02S 20/32; F24S 50/60; Y02E 10/47
See application file for complete search history.

(56) References Cited

U.S. PATENT DOCUMENTS

| | | | |
|---|---|---|---|
| 4,137,897 A | 2/1979 | Moore | |
| 8,459,249 B2 | 6/2013 | Corio | |
| 8,466,399 B1 | 6/2013 | Sherman | |
| 2003/0034029 A1 | 2/2003 | Shingleton | |
| 2007/0227574 A1 | 10/2007 | Cart | |
| 2007/0297058 A1 | 12/2007 | Briee et al. | |
| 2009/0114211 A1 | 5/2009 | Homyk et al. | |
| 2010/0018570 A1 | 1/2010 | Cashion et al. | |

(Continued)

FOREIGN PATENT DOCUMENTS

| | | |
|---|---|---|
| CN | 207573291 U | 7/2018 |
| FR | 3038397 A1 | 1/2017 |

(Continued)

OTHER PUBLICATIONS

First Examination Report issued in Indian Patent Application No. 202117020514 dated Feb. 24, 2022.

(Continued)

*Primary Examiner* — Angelo Trivisonno (74) *Attorney, Agent, or Firm* — Fredrikson & Byron, P.A.

(57) ABSTRACT

Methods and systems of managing dynamic response to wind in a solar tracker system are provided. The method includes determining a wind speed, comparing the wind speed to a predetermined threshold value to determine if the wind speed equals or exceeds the predetermined threshold, positioning a windward most solar tracker to a predetermined angle based on the comparing, and positioning a leeward most solar tracker to the predetermined angle based on the comparing. The solar trackers are positioned at the predetermined angle at a predetermined interval starting at the windward most solar tracker and the remaining solar trackers remain in a normal operating condition.

20 Claims, 4 Drawing Sheets

(56) References Cited

U.S. PATENT DOCUMENTS

| | | |
|---|---|---|
| 2010/0101630 A1 | 4/2010 | Kats et al. |
| 2010/0199971 A1 | 8/2010 | Chyou et al. |
| 2010/0212653 A1 | 8/2010 | McDonald |
| 2011/0023940 A1 | 2/2011 | Do et al. |
| 2011/0073161 A1 | 3/2011 | Scanlon |
| 2011/0092094 A1 | 4/2011 | Rueggen et al. |
| 2011/0232631 A1 | 9/2011 | Boehmer |
| 2011/0308512 A1 | 12/2011 | Nakasato et al. |
| 2012/0004780 A1 | 1/2012 | Miller et al. |
| 2012/0048341 A1 | 3/2012 | Mikhael et al. |
| 2012/0072041 A1 | 3/2012 | Miller et al. |
| 2012/0091077 A1 | 4/2012 | Zuritis |
| 2012/0180845 A1 | 7/2012 | Cole et al. |
| 2013/0006435 A1 | 1/2013 | Berrios et al. |
| 2013/0048048 A1* | 2/2013 | Flanery .............. F24S 40/20 136/246 |
| 2013/0133641 A1* | 5/2013 | Shvets .............. F24S 50/60 126/714 |
| 2013/0269754 A1 | 10/2013 | Judkins |
| 2014/0182577 A1 | 7/2014 | Linderman et al. |
| 2014/0196761 A1 | 7/2014 | Tilley et al. |
| 2015/0092383 A1 | 4/2015 | Corio et al. |
| 2015/0177415 A1 | 6/2015 | Bing |
| 2015/0331972 A1 | 11/2015 | McClure et al. |
| 2016/0056759 A1 | 2/2016 | Pinneo et al. |
| 2016/0179994 A1 | 6/2016 | Levine et al. |
| 2017/0070187 A1 | 3/2017 | Jain et al. |
| 2017/0318919 A1 | 11/2017 | Gharabegian |
| 2018/0054156 A1 | 2/2018 | Lokey |
| 2018/0175783 A1 | 6/2018 | Schimelpfenig et al. |
| 2018/0186433 A1 | 7/2018 | Gharabegian |

FOREIGN PATENT DOCUMENTS

| | | |
|---|---|---|
| KR | 100896332 B | 5/2009 |
| KR | 100896332 B1 | 5/2009 |
| KR | 20170113723 A | 10/2017 |
| WO | 2012014153 A2 | 2/2012 |
| WO | 2012076949 A1 | 6/2012 |
| WO | 2017007983 A1 | 1/2017 |

OTHER PUBLICATIONS

International Search Report and Written Opinion for PCT/US2013/073948, filed on Dec. 9, 2013.
PCT Search Report and Written Opinion issued in PCT Application No. PCT/US18/041045 dated Oct. 17, 2018.
PCT Search Report and Written Opinion issued in PCT Application No. PCT/US2019/062274 dated Jan. 24, 2020, 12 pages.
Extended European Search Report issued in European Patent Application No. 19886850.7 dated Oct. 26, 2022, 9 pages.
Examination Report No. 1 issued in Australian Patent Application No. 2019383977 dated Feb. 3, 2022.

\* cited by examiner

STAGED STOWAGE OF SOLAR TRACKERS AND METHOD THEREOF

CROSS-REFERENCE TO RELATED APPLICATION

This application is a divisional of U.S. patent application Ser. No. 16/196,817, filed on Nov. 20, 2018, the entire content of which is incorporated by reference herein.

BACKGROUND

Technical Field

The present disclosure relates to solar power generation systems, and more particularly, to solar tracker actuating systems for adjusting the orientation of the solar power generation components to track the location of the sun.

Background of Related Art

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length.

Adjusting massive solar trackers requires power to drive the solar array as it follows the sun. As will be appreciated, the greater the load, the greater the amount of power necessary to drive the solar tracker. An additional design constraint of such systems is the rigidity required to accommodate the weight of the solar arrays and at times significant wind loading.

Further, the torsional excitation caused by wind loading exerts significant force upon the structure for supporting and the mechanisms for articulating the solar tracker. As such, increases in the size and number of components to reduce torsional excitation are required at varying locations along the length of the solar tracker. The present disclosure seeks to address the shortcomings of prior tracker systems.

SUMMARY

The present disclosure is directed to a method of managing dynamic response to wind in a solar tracker system are provided. The method includes determining a wind speed, comparing the wind speed to a predetermined threshold value to determine if the wind speed equals or exceeds the predetermined threshold, positioning a windward most solar tracker to a predetermined angle based on the comparing, and positioning a leeward most solar tracker to the predetermined angle based on the comparing. The solar trackers are positioned at the predetermined angle at a predetermined interval starting at the windward most solar tracker and the remaining solar trackers remain in a normal operating condition.

In aspects, the determining includes a gradated series of wind speeds. In other aspects the predetermined angle includes a gradated series of angles.

In certain aspects the predetermined threshold value includes a gradated series of thresholds. In other aspects, the predetermined interval is every fourth solar tracker.

According to another aspect of the present disclosure a method of managing dynamic response to wind in a solar tracker. The method includes determining a wind speed, comparing the wind speed to a predetermined threshold value to determine if the wind speed equals or exceeds the predetermined threshold, and positioning a first and a second solar tracker to a first predetermined angle and a second predetermined angle based on the comparing.

In aspects, the second predetermined angle is rotated in the opposing angle of the first predetermined angle.

In other aspects, the method further includes determining a position of the first solar tracker, determining a position of the second solar tracker; determining a shading of the first and second solar tracker, communicating the position of the first and second solar tracker, positioning at least one of the first and second solar tracker based on the determined position of adjacent solar trackers to reduce the shading.

In certain aspects, the communication includes wireless communication.

According to another aspects of the present disclosure a solar tracker system includes a solar tracker including a plurality of solar modules, each of the solar modules being spatially configured to face in a normal manner in an on sun position in an incident direction of electromagnetic radiation derived from the sun. The solar modules include a tracker controller. The tracker controller includes a processor, a memory with instructions stored thereon, a power supply configured to provide power to the tracker controller, and a motor controller. The tracker controller is configured track the sun position. The tracker controller is configured to determine the wind speed. The processor compares the wind speed to a predetermined threshold value to determine if the wind speed equals or exceeds the predetermined threshold and positioned a windward most solar tracker to a predetermined angle based on the comparing. Solar trackers are positioned at the predetermined angle at a predetermined interval starting at the windward most solar tracker. The processor positioned a leeward most solar tracker to the predetermined angle based on the comparing. The remaining solar trackers remain in a normal operating condition.

In aspects, the determining includes a gradated series of wind speeds.

In other aspects, the predetermined angle includes a gradated series of angles.

In certain aspects, the predetermined threshold value includes a gradated series of thresholds.

In yet another aspect, the predetermined interval is every fourth solar tracker.

BRIEF DESCRIPTION OF THE DRAWINGS

Various aspects of the present disclosure are described herein below with reference to the drawings, which are incorporated in and constitute a part of this specification, wherein.

DETAILED DESCRIPTION

The present disclosure is directed to solar tracking systems and methods for articulating a solar tracking system to compensate for the impacts of wind and wind loading of solar tracker systems. In general a solar tracking system includes a solar array that is supported by a plurality of support beams. The plurality of support beams, in turn, is supported by a plurality of torque tubes. The plurality of torque tubes are coupled to an articulation system, which in turn, is supported by a plurality of bases that is configured to be anchored in the ground or to a stationary structure.

With reference to FIGS. 1-5, a solar tracking system capable of tracking the location of the sun provided in accordance with the present disclosure is illustrated and generally identified by reference numeral 10. The solar tracking system 10 includes a solar array 20, a plurality of support beams 30 (FIG. 3) that are configured to support the solar array 20, a plurality of torque tubes 40 (FIG. 2) that are configured to support the plurality of support beams 30), a plurality of bases 50 that is configured to rotatably support the plurality of torque tubes 40, and an articulation system 100 (FIG. 1) that is configured to rotate the plurality of torque tubes 40, and therefore the solar array 20, relative to the base 50.

Figure 1:
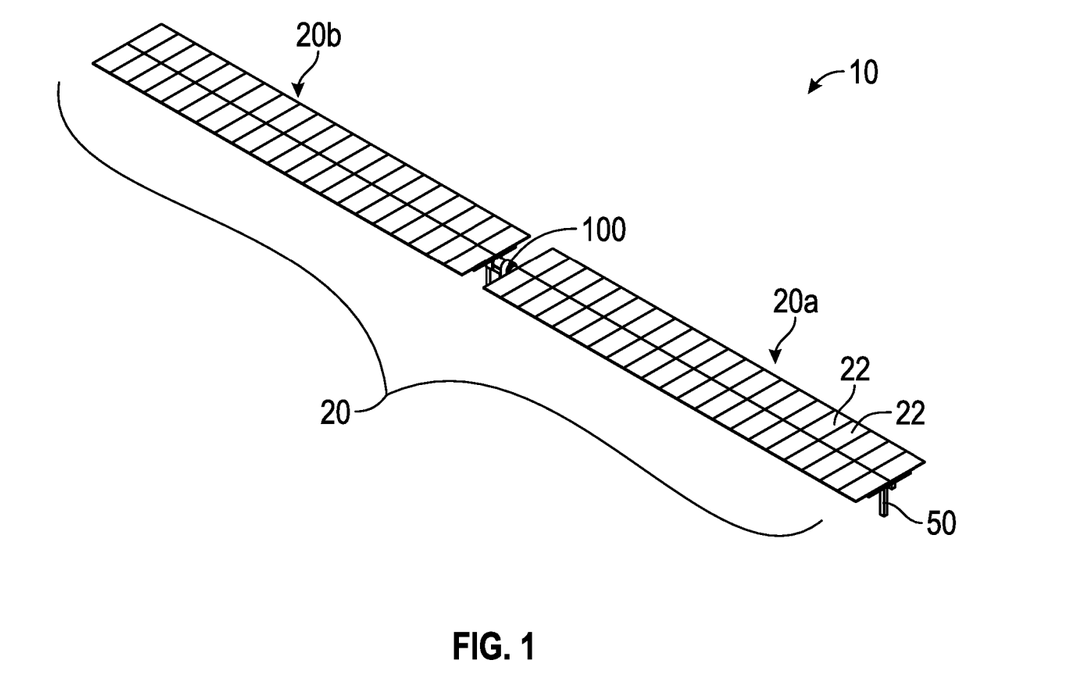
FIG. 1 is a top, perspective view of a solar tracking system provided in accordance with the present disclosure that is configured to articulate the angle of a solar array to track the location of the sun.
Figure 2:
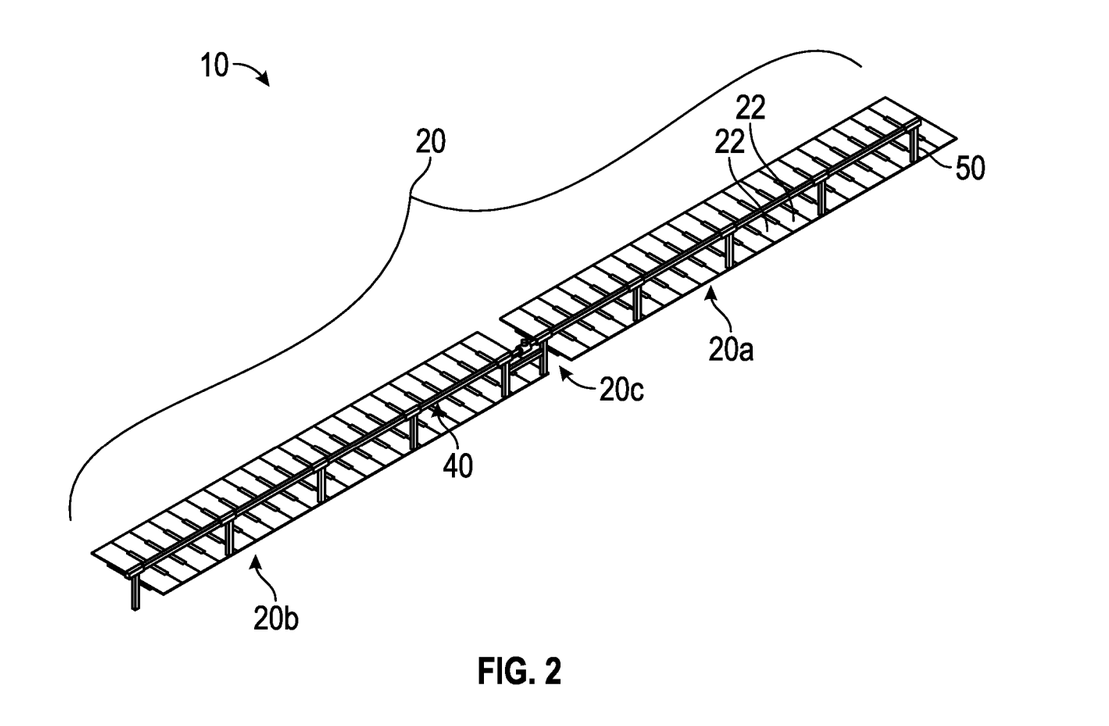
FIG. 2 is a bottom, perspective view of the solar tracking system of FIG. 1.

In one embodiment, as illustrated in FIG. 1, the solar array 20 is broken up into a first portion 20a and a second portion 20b, where the first and second portions 20a, 20b are spaced apart from one another along the length thereof defining a gap 20c there between. Each portion of the first and second portions 20a, 20b is substantially similar, thus, only the first portion 20a will be described in detail herein below in the interest of brevity. The first portion 20a of the solar array 20 includes a plurality of photovoltaic modules 22, each of which is mechanically and electrically coupled to one another, although it is contemplated that each (or a group of) photovoltaic module 22 may be mechanically and/or electrically insulated from one another. In embodiments, the photovoltaic modules 22 may be any suitable photovoltaic module capable of generating electrical energy from sunlight, such as monocrystalline silicon, polycrystalline silicon, thin-film, etc. The photovoltaic modules 22 define an upper surface 22a and an opposite, bottom surface 22b. As can be appreciated, the upper surface 22a of the photovoltaic modules 22 includes the photovoltaic cells (not shown) while the bottom surface 22b includes any suitable means for fixedly or selectively coupling the photovoltaic modules 22 to the plurality of support beams 30, such as mechanical fasteners (e.g., bolts, nuts, etc.), adhesives, welding, etc. In embodiments, the photovoltaic cells may be disposed within a suitable frame 22c (FIG. 3) which includes suitable means for fastening the photovoltaic modules 22 to the plurality of support beams 30. In this manner, the frame 22c may include fastening means on a bottom surface thereof, or clamps or other suitable fasteners (e.g., Z-brackets, C-clamps, angle brackets, etc.) may be utilized to about a portion of the frame 22c and selectively or fixedly couple the frame 22c to the plurality of support beams 30. Although generally illustrated as having a generally U-shaped profile, it is contemplated that the support beam 30 may include any suitable profile, such square, rectangular, oval, etc. It is envisioned that the support beam 30 may be selectively or fixedly coupled to the torque tube 40 and/or frames 22c of the photovoltaic modules 22 using any suitable means, such as mechanical fasteners (e.g., bolts, clamps, etc.), adhesives, welding, etc. In one non-limiting embodiment, the support beam 30 is coupled to the torque tube using a U-bolt or other similar fastener.

Figure 3:
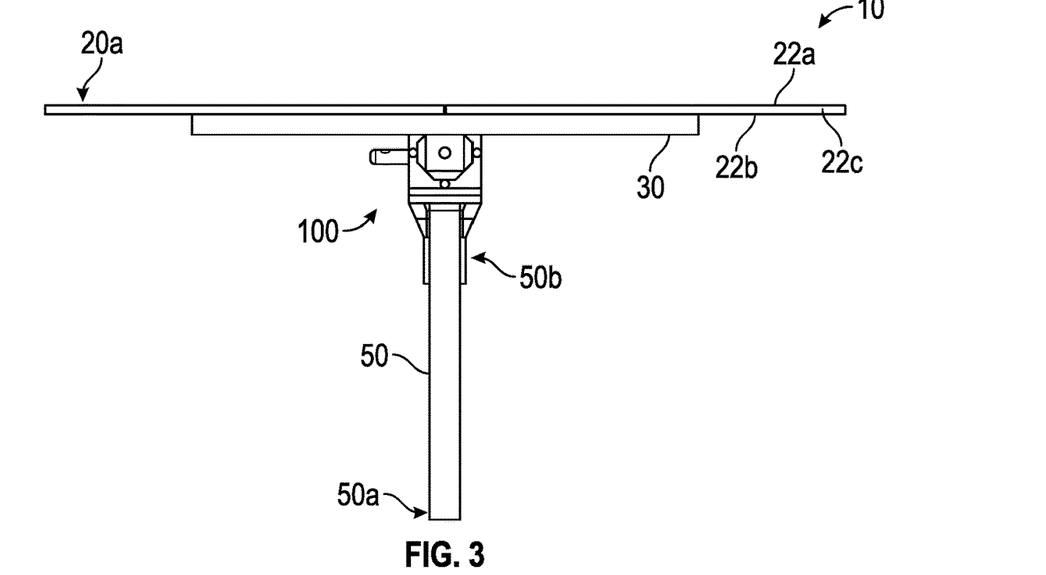
FIG. 3 is an end view of the solar tracking system of FIG. 1 shown with a solar array of the solar tracking system in a horizontal orientation.

FIG. 3 depicts a typical stowed position for a solar tracker. In this position or the 0° position the photovoltaic modules 22 are essentially parallel to the ground. This has been the position that most solar tracker manufacturers recommend and specify that the solar tracker return to when the wind speeds observed at about three meters above the ground reach approximately 30 miles-per-hour (MPH).

It has been previously reported that the position of the solar tracker 10 in FIG. 3 represents the most beneficial position to prevent damage to the solar tracker 10 by the wind. Further, it is common for solar tracker arrangements, where there are multiple trackers 10 arranged in parallel north-south lines, to be mechanically coupled to one another such that all of the solar trackers 10 move in unison as they track the path of the sun from east to west. As a result, for most solar tracker facilities, upon observation of a wind speed in excess of some threshold (e.g., 30 MPH) the entire field of trackers 10 moves to a 0° position. Even for some solar tracker 10 facilities where the solar trackers are not mechanically coupled, the 0° position stow strategy remains the industry standard. The immediate result is that that in windy conditions, the energy production from the solar tracker 10 is significantly reduced, as the tracker is prevented from following the sun. But another result, is that in this position the solar trackers experience turbulence, oscillations, and in fact incredible stresses. Indeed, applications have determined that because of the alternating stresses applied to the tracker 10 as wind flows both over and under the photovoltaic modules 22 in the 0° position, this is in fact one of the worst wind stowage positions for a solar tracker.

Figure 4:
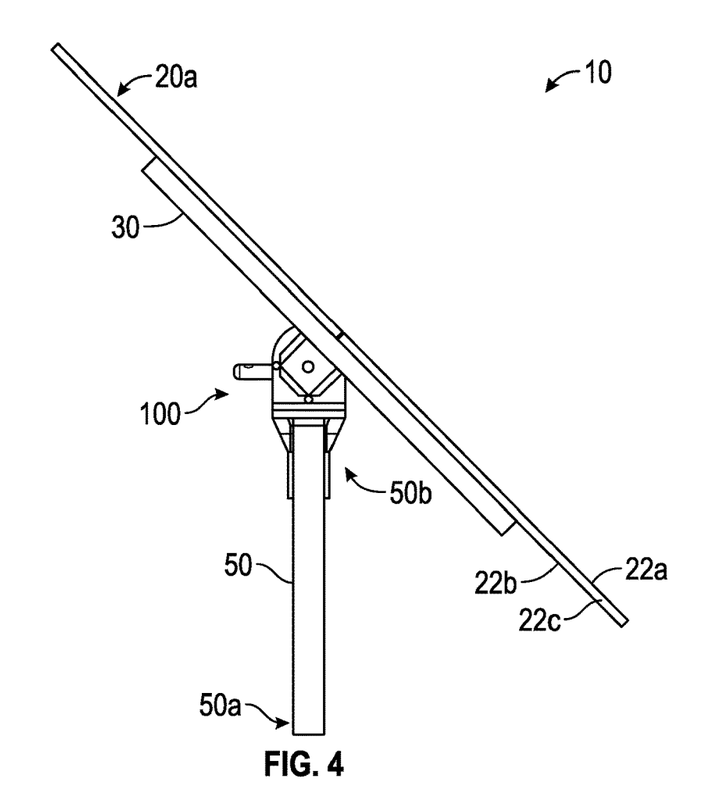
FIG. 4 is an side view of the solar tracking system of FIG. 1 shown with a solar array of the solar tracking system in an articulated orientation.

One aspect of the present disclosure is directed to an alternative slow position. This alternative stow position is depicted in FIG. 4. As seen in FIG. 4, rather than the 0° position, the solar tracker 10, and therewith the photovoltaic modules 22, are arranged at about a 30° down angle facing the wind. That is the edge of the photovoltaic module 22 closest to the direction of the wind, is angled below horizontal, about 30°. The result is that the forces acting on the tracker. Though described herein as about 30°, the present disclosure is not so limited, any down angle will result in some benefit in the experienced wind loading, however, a greater than 30° down angle has resulted in consistently greater benefits. The contemplated ranges of down angle are 10-15, 15-20, 20-25, 25-30, 30-35, 35-40, 40-45, 45-50, 50-55, and 55-60. However, contemplated ranges are not intended to be limiting.

Even though the flow of air over the trackers results in a more stable flow causing less turbulence and oscillation, if as is common, the solar trackers 10 are mechanically linked, the resulting position will still result in considerable decrease in energy production. Indeed, this is particularly heightened in instances where it is an east wind that causes the movement of the solar trackers 10 in that direction, and it is afternoon, where the sun is west of its zenith. In such a scenario, the solar trackers 10 would generate even less power than those at the 0° position.

Figure 5:
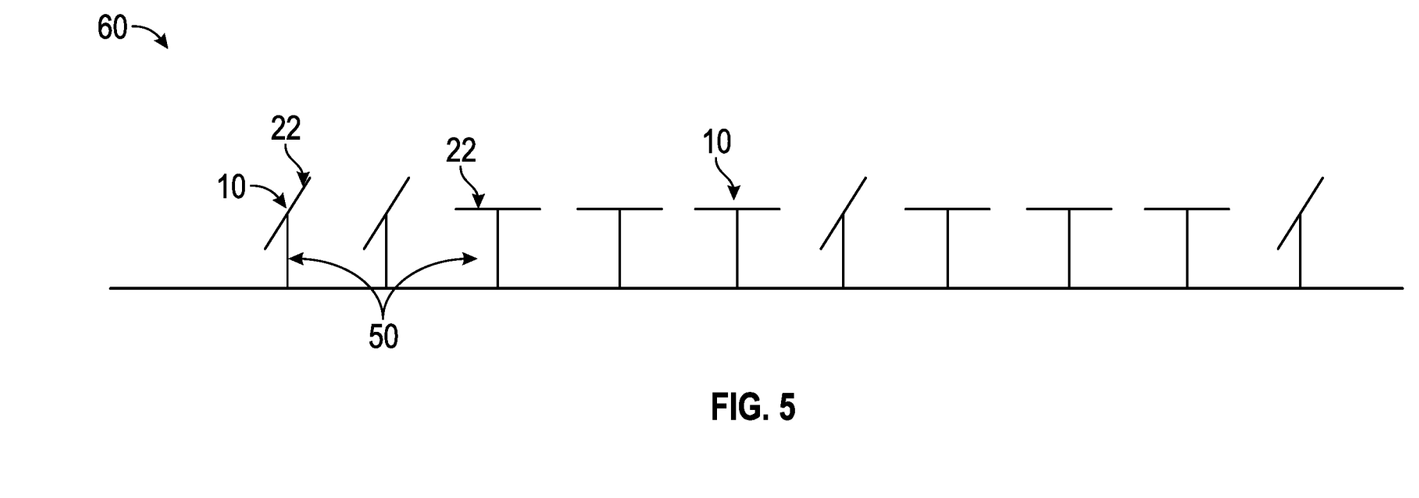
FIG. 5 is a side view of a field of the solar tracking systems of FIG. 1 shown with solar arrays of the solar tracking system in a staged stow arrangement.

With reference to FIG. 5, a further aspect of the present disclosure is directed to a staged stow arrangement is shown. In an exemplary staged stow arrangement, the windward most (e.g., either the east most or west most) solar tracker 10 of a solar power plant 60 is placed in the stowed position 30° down angle at a first detected wind speed (e.g., 30 MPH). This allows the windward most solar tracker 10 to serve as a temporary wind fence for the subsequent rows of solar trackers 10 and normalize wind vectors. In addition to the east most solar tracker 10, every successive fourth tracker 10 of the solar power plant 60, is also placed in the stowed position (e.g., 30° down angle). Finally, the leeward most tracker 10 may also be placed in the stowed position. As will be appreciated, this can only be employ if each tracker 10 is independently movable relative to the other trackers 10. Such an arrangement and the mechanisms for action are described in greater detail in the commonly assigned U.S. Pat. No. 9,905,717 entitled Horizontal Balanced Solar Tracker filed Dec. 9, 2012, and incorporated herein by reference.

With each tracker 10 being independently driven, and capable of the staged stow arrangement described above, a significant portion of all of the trackers 10 of the solar power plant 60 remain in normal operation tracking the sun across the sky and only a portion of the solar trackers 10 experience a reduction in energy production. A further aspect of the present disclosure is that rather than have a single wind speed threshold for stowing the solar trackers 10, a gradated series of wind speeds can be used to move trackers into the stowed position. In this scenario, a first portion of the solar trackers 10 can be placed in the stowed position at a predetermined wind speed (e.g., 30 MPH) and a second portion can be placed in a stowed position at a second predetermined wind speed (e.g., 40 MPH) and all of the solar trackers 10 may be placed in the stowed position at a third wind speed (e.g., 50 MPH). The number of stages, the parameters, and which rows of trackers 10 stow can be adjusted depending on site specific information (e.g., prevailing wind direction, peak wind speeds, etc.).

Figure 6:
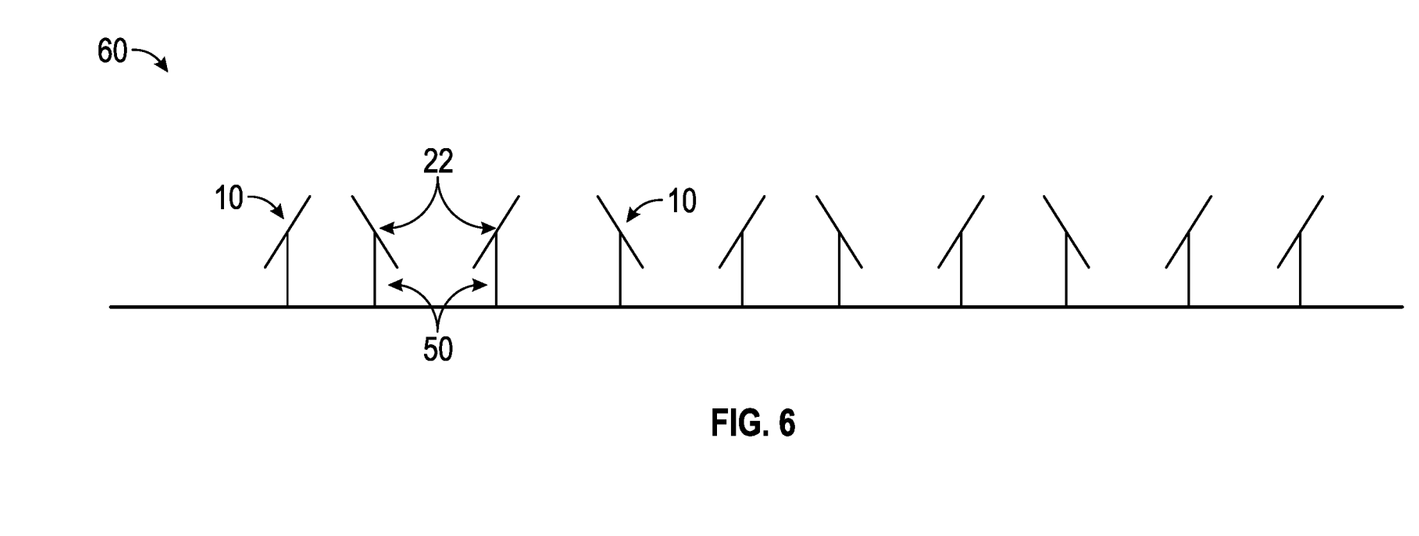
FIG. 6 is a side view of a field of the solar tracking systems of FIG. 1 shown with solar arrays of the solar tracking system in a "W" stow arrangement.

FIG. 6 is a side view of a field of the solar tracking systems of FIG. 1 shown with solar arrays of the solar tracking system in a "W" stow arrangement, in accordance with the present disclosure. A further aspect of the present disclosure is directed to a W-stow arrangement of the solar trackers 10. In the W-arrangement, every other tracker 10 rotates in opposing directions. As a result. If the windward most tracker rotates 30° down angle, the next tracker 10 would rotate 30° up angle. The resulting turbulence of the multiple ridges in this W arrangement across the solar power plant results in reduced force impacting all of the solar trackers 10. Various eddies and counter flows induced by this arrangement affect not just the flow of air over trackers 10 deep within the solar power plant, but also those trackers 10 on the windward most side of the solar power plant 60. Moreover, the resulting turbulence helps to reduce oscillations and prevent any single tracker from approaching any of its harmonics, which could be very detrimental to the trackers 10 and the power plant as a whole. Though described in connection with a 30° down and up angles, other angles are contemplated within the scope of the present disclosure.

In practice, upon observing a threshold wind speed, the individually movable trackers 10 can be driven in the appropriate direction to form the W-shape. That is, each tracker 10 is driven in the opposite direction of the trackers 10 on either side. As will be appreciated, there is some risk of shading of a neighboring tracker 10 as a result of the W-stow position. Accordingly, those of skill in the art will appreciate that one or more of the trackers may be driven to a greater or lesser angle than its neighbors in order to avoid this shading, which can dramatically reduce energy production.

Figure 7:
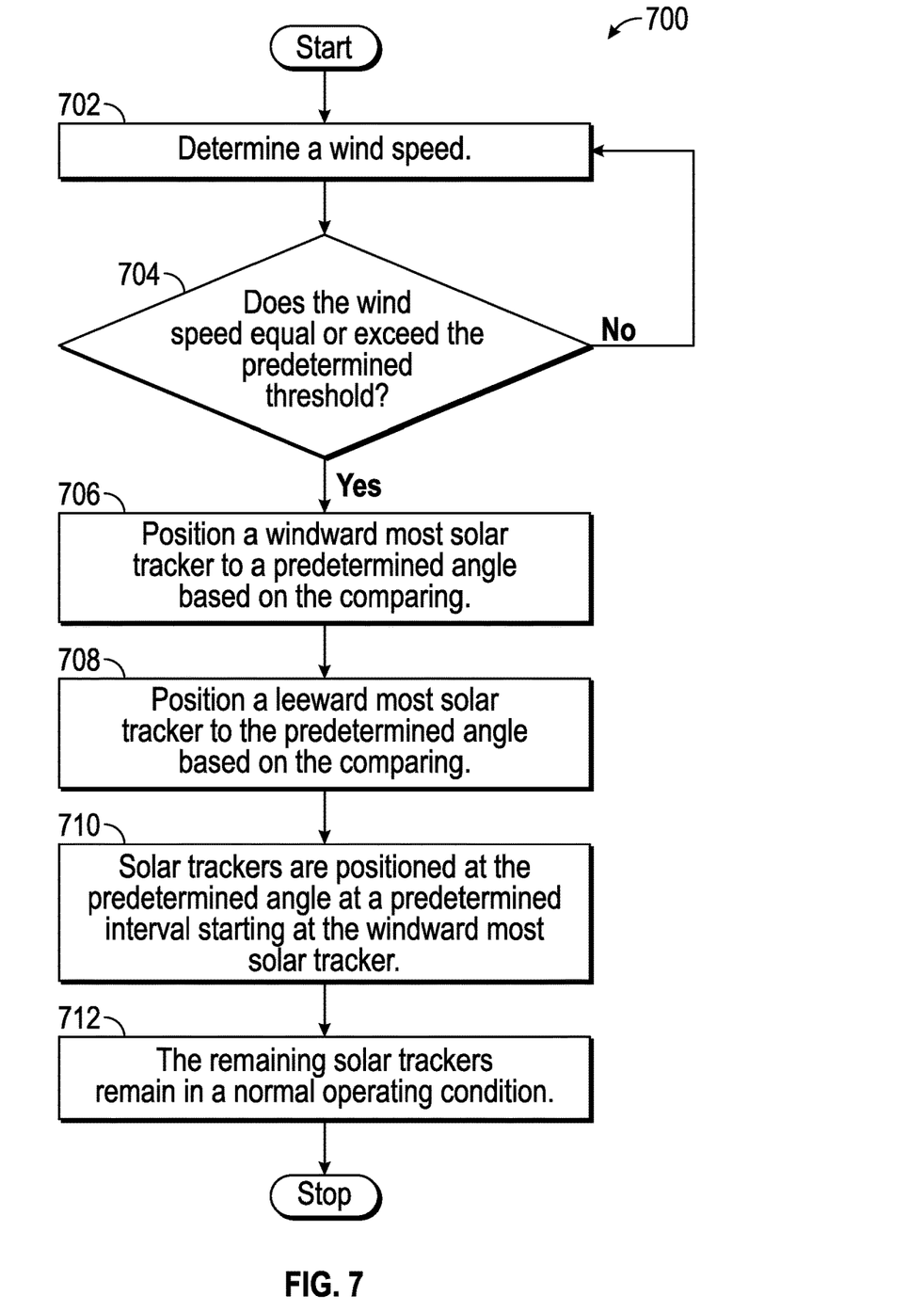
FIG. 7 depicts a logic flow for a control algorithm in accordance with the present disclosure.

With reference to FIG. 7 the flow diagram includes various blocks described in an ordered sequence, in accordance with the present disclosure. However, those skilled in the art will appreciate that one or more blocks of the flow diagram may be performed in a different order, repeated, and/or omitted without departing from the scope of the present disclosure. Further, the below description of the flow diagram refers to various actions or tasks performed by one or more controllers, but those skilled in the art will appreciate that in some instances, the controllers perform the actions or tasks via one or more software applications, such as the application which could be firmware, executing on the controllers.

FIG. 7 depicts a logic flow for a control algorithm 700 in accordance with the present disclosure. Initially, at block 702 the controller determines the wind speed at the solar power plant 60. The wind speed may be determined, for example, by a wind speed sensor, or by receiving this information over a network. The network may be wireless or wired. In an embodiment the controller is configured to wirelessly (e.g., Zigbee, Wi-fi, Bluetooth®, etc.) communicate the wind speed to a wireless device, or to the Cloud for monitoring. It is contemplated that the signal could be communicated to a device with a display or dashboard for monitoring multiple solar trackers 10. The wind speed sensor may be integrated or remote. At block 704, the controller determines whether the wind speed equals or exceeds a predetermined threshold. The predetermined threshold may be for example 40 miles per hour. If the wind speed does not exceed this predetermined threshold ("No" at block 704) then the controller continues to monitor the wind speed. If the wind speed does exceed the predetermined threshold ("Yes" at block 704), then at block 706 the controller positions the windward most solar tracker 10 to a predetermined angle based on this wind speed. For example, the predetermined angle may be 30 degrees down angle.

At block 708 the leeward most solar tracker 10 is positioned at the predetermined angle based. At block 710, solar trackers 10 at a predetermined interval are positioned at the predetermined angle. For example, the predetermined interval may be every fourth solar tracker 10 starting from the most windward solar tracker. For example, by getting every fourth row to a high angle, like 30 degrees, the remaining rows are shielded, thus creating a "wind fence" intermittently throughout the row. At block 712, the remaining solar trackers 10 remain in a normal operating condition. For example, this would allow the remaining solar trackers 10 to maximize energy production. For example, the two exterior rows and every fourth interior row are positioned into stow at the predetermined 30 degrees down angle, and the remaining interior rows can either operate normally or stow horizontally.

In another embodiment, two sets of parameters are used for the stow logic. A set of primary parameters, which use a first stow trigger speed on the most windward and leeward solar tracker 10 rows, as well as rows at a predetermined interval. A set of secondary parameters, which use a second set of stow trigger speeds, which are higher than the first stow trigger speed. For example, the primary parameters may be stow at 30 mph, dwell for 15 minutes, and unstow at 20 mph. Whereas the secondary parameters may be stow at 33 mph, dwell for 15 minutes, and unstow at 23 mph. Thus allowing for an increase in the allowable tracking speed on interior rows and a decrease in stow hours.

In another embodiment, the risk associated with higher secondary parameters may be monitored. For example this can be calculated by analyzing motor current, flutter amplitude, and tracker performance during wind events at the site.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

We claim:

1. A solar tracker system, comprising:
a solar tracker array including a plurality of solar trackers, each of the solar trackers being spatially configured to face in a normal manner in an on sun position in an incident direction of electromagnetic radiation derived from the sun, wherein the solar tracker array includes:
a tracker controller operably coupled to the solar tracker array, including:
a processor;
a memory operably coupled to the processor, the memory including instructions stored thereon, which when executed by the processor cause the tracker controller to:
determine a wind speed,
compare the wind speed to a predetermined threshold value to determine if the wind speed equals or exceeds a first predetermined threshold;
position a windward most solar tracker in the array to a predetermined angle based on the comparing; and
position a leeward most solar tracker in the array to the predetermined angle based on the comparing,
wherein a plurality of the solar trackers in the array is positioned at the predetermined angle at a predetermined interval starting at the windward most solar tracker,
wherein when the determined wind speed exceeds the first predetermined threshold, the plurality of solar trackers between the windward most solar tracker and the leeward most solar tracker remain in a normal operating condition.

2. The system of claim 1, wherein the predetermined threshold value is one of a gradated series of wind speeds to which the determined wind speed is compared.

3. The system of claim 2, wherein the predetermined angle is one of a gradated series of angles to which the plurality of solar trackers between the windward most solar tracker and the leeward most solar tracker can be positioned for each gradated series of wind speeds.

4. The system of claim 3, wherein at a second determined windspeed the plurality of solar trackers between the windward most solar tracker and the leeward most solar tracker is positioned a second predetermined angle at a predetermined interval of solar trackers.

5. The system of claim 3, wherein the windspeed is determined using a wind speed sensor operably coupled to the tracker controller.

6. The system of claim 3, wherein the windspeed is determined by receiving windspeed information over a network interface operably coupled to the controller.

7. The system of claim 3, further comprising a motor controller operably coupled to the solar trackers in the solar tracker array.

8. The system of claim 3, wherein the predetermined angle is a 30 degree down angle.

9. The system of claim 3, wherein the predetermined threshold value is 40 miles per hour.

10. A solar tracker system, comprising:
a solar tracker array;
a tracker controller operably coupled to the solar tracker array, the tracker controller configured to:
determine a wind speed;
compare the wind speed to a predetermined threshold value to determine if the wind speed equals or exceeds a first predetermined threshold;
position a windward most solar tracker in the array to a predetermined angle based on the comparing; and
position a leeward most solar tracker in the array to the predetermined angle based on the comparing,
wherein a plurality of solar trackers in the array is positioned at the predetermined angle at a predetermined interval starting at the windward most solar tracker,
wherein when the determined wind speed exceeds the first predetermined threshold, the plurality of solar trackers between the windward most solar tracker and the leeward most solar tracker remain in a normal operating condition.

11. The solar tracker system according to claim 10, wherein the predetermined threshold value is one of a gradated series of wind speeds to which the determined wind speed is compared.

12. The solar tracker system according to claim 11, wherein the predetermined angle is one of a gradated series of angles to which the plurality of solar trackers between the windward most solar tracker and the leeward most solar tracker can be positioned for each gradated series of wind speeds.

13. The solar tracker system according to claim 12, wherein the tracker controller is configured to determine a second windspeed.

14. The solar tracker system according to claim 13, wherein at the second windspeed, the tracker controller is configured to position the plurality of solar trackers between the windward most solar tracker and the leeward most solar tracker at a second predetermined angle at a predetermined interval of solar trackers.

15. The system of claim 10, wherein the windspeed is determined using a wind speed sensor operably coupled to the tracker controller.

16. The system of claim 10, wherein the windspeed is determined by receiving windspeed information over a network interface operably coupled to the controller.

17. The system of claim 10, further comprising a motor controller operably coupled to the solar trackers in the solar tracker array.

18. A solar tracker system, comprising:
a solar tracker array;
a motor controller operably coupled to the tracker array;
a tracker controller operably coupled to motor controller, the tracker controller configured to:
determine a wind speed;

compare the wind speed to a predetermined threshold value to determine if the wind speed equals or exceeds a first predetermined threshold;

position a windward most solar tracker in the array to a predetermined angle based on the comparing; and position a leeward most solar tracker in the array to the predetermined angle based on the comparing, wherein a plurality of solar trackers in the array is positioned at the predetermined angle at a predetermined interval starting at the windward most solar tracker, wherein when the determined wind speed exceeds the first predetermined threshold, the plurality of solar trackers between the windward most solar tracker and the leeward most solar tracker remain in a normal operating condition.

19. The system of claim 18, wherein the windspeed is determined using a wind speed sensor operably coupled to the tracker controller.

20. The system of claim 19, wherein the windspeed is determined by receiving windspeed information over a network interface operably coupled to the controller.

* * * * *